(12) United States Patent
Whalen et al.

(10) Patent No.: US 10,369,748 B2
(45) Date of Patent: Aug. 6, 2019

(54) FRICTION STIRRING INTERLOCKING OF DISSIMILAR MATERIALS

(71) Applicant: BATTELLE MEMORIAL INSTITUTE, Richland, WA (US)

(72) Inventors: Scott A. Whalen, Richland, WA (US); Md. Reza-E-Rabby, Richland, WA (US); Kenneth A. Ross, West Richland, WA (US); Aashish Rohatgi, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 28 days.

(21) Appl. No.: 15/794,687

(22) Filed: Oct. 26, 2017

(65) Prior Publication Data

US 2019/0126561 A1 May 2, 2019

(51) Int. Cl.
| | |
|---|---|
| *B23K 20/12* | (2006.01) |
| *B29C 65/06* | (2006.01) |
| *B21J 15/02* | (2006.01) |
| *B23K 103/08* | (2006.01) |
| *B23K 103/20* | (2006.01) |
| *B23K 103/16* | (2006.01) |

(52) U.S. Cl.
CPC ......... *B29C 65/0681* (2013.01); *B21J 15/027* (2013.01); *B23K 20/127* (2013.01); *B23K 20/129* (2013.01); *B23K 2103/15* (2018.08); *B23K 2103/16* (2018.08); *B23K 2103/20* (2018.08)

(58) Field of Classification Search
CPC ... B23K 20/122–20/128; B23K 20/129; B23K 20/127; B23K 2103/15; B23K 2103/20; B23K 2103/16–2103/172; B23K 2103/10; B29C 65/0681; B21J 15/027
USPC .................................................. 228/112.1, 2.1
See application file for complete search history.

(56) References Cited

U.S. PATENT DOCUMENTS

| | | | | |
|---|---|---|---|---|
| 6,045,027 | A * | 4/2000 | Rosen ................... | B23K 20/122 228/112.1 |
| 6,843,404 | B2 * | 1/2005 | Litwinski ............... | B21J 15/027 228/112.1 |
| 6,933,057 | B2 * | 8/2005 | Young ................. | B23K 20/1265 228/112.1 |
| 6,955,852 | B2 * | 10/2005 | Ivanov ................... | B21K 25/00 204/298.12 |
| 7,862,271 | B2 | 1/2011 | Wang et al. | |

(Continued)

FOREIGN PATENT DOCUMENTS

| | | | | |
|---|---|---|---|---|
| JP | 2006205190 | A * | 8/2006 | |
| JP | 2007222925 | A * | 9/2007 | ........... B21K 25/005 |

(Continued)

*Primary Examiner* — Kiley S Stoner
(74) *Attorney, Agent, or Firm* — Derek H. Maughan

(57) ABSTRACT

A method for solid state joining of dissimilar materials using a friction stir welding device wherein a pin is inserted through an aperture defined in a first material and a second material to hold the materials together and then held in place by friction stir welding a portion of the pin to a material adjacent said pin, or by friction stir welding a cap or plug that holds the pin in place to the adjacent material. The result is a connection or join wherein the central portion of the pin is not friction stir welded but the portions holding the pin in place (the ends or caps) generally are.

10 Claims, 8 Drawing Sheets

(56) References Cited

U.S. PATENT DOCUMENTS

| | | | | |
|---|---|---|---|---|
| 8,061,579 B2 * | 11/2011 | Feng | B23K 20/1225 | 228/112.1 |
| 8,479,970 B2 * | 7/2013 | Ishibashi | B23K 20/1265 | 228/112.1 |
| 9,511,446 B2 * | 12/2016 | Kandasamy | B23K 20/1215 | |
| 2003/0075584 A1 * | 4/2003 | Sarik | B23K 20/122 | 228/2.1 |
| 2003/0217452 A1 * | 11/2003 | Talwar | B23K 20/122 | 29/402.14 |
| 2005/0116012 A1 * | 6/2005 | Packer | B23K 20/1225 | 228/112.1 |
| 2005/0274776 A1 * | 12/2005 | Takeda | B23K 9/232 | 228/262.4 |
| 2007/0090516 A1 * | 4/2007 | White | C23C 16/4586 | 257/704 |
| 2009/0258232 A1 * | 10/2009 | Brice | B23K 20/122 | 428/408 |
| 2014/0274726 A1 * | 9/2014 | Sugimoto | H01L 39/2403 | 505/231 |
| 2014/0294489 A1 * | 10/2014 | Sakai | B62D 25/02 | 403/267 |
| 2016/0153287 A1 * | 6/2016 | Roach | C25D 7/00 | 415/119 |
| 2016/0159488 A1 * | 6/2016 | Roach | B29D 22/00 | 416/245 R |
| 2016/0160863 A1 * | 6/2016 | Roach | B32B 27/281 | 415/119 |
| 2016/0160869 A1 * | 6/2016 | Roach | F04D 29/023 | 415/200 |
| 2016/0167353 A1 * | 6/2016 | Fan | B32B 15/08 | 216/39 |
| 2016/0187080 A1 * | 6/2016 | Remsburg | B32B 15/017 | 165/185 |
| 2016/0193685 A1 * | 7/2016 | Karner | B23K 9/125 | 403/270 |
| 2017/0008121 A1 * | 1/2017 | Li | B23K 20/129 | |
| 2017/0095876 A1 * | 4/2017 | Mizobata | B23K 9/232 | |
| 2017/0197274 A1 * | 7/2017 | Steel | B23K 20/1265 | |
| 2017/0361395 A1 * | 12/2017 | Tomioka | B23K 20/122 | |
| 2017/0361540 A1 * | 12/2017 | Li | B23K 20/22 | |
| 2018/0050496 A1 * | 2/2018 | Racineux | B23K 20/06 | |
| 2018/0073532 A1 * | 3/2018 | Whalen | B23K 20/1265 | |
| 2018/0154426 A1 * | 6/2018 | Xiao | B23K 20/22 | |
| 2018/0272618 A1 * | 9/2018 | Li | B23K 20/22 | |

FOREIGN PATENT DOCUMENTS

| | | | | | |
|---|---|---|---|---|---|
| JP | 2008137064 A | * | 6/2008 | | |
| JP | 2016153133 A | * | 8/2016 | | |
| JP | 2017070963 A | * | 4/2017 | | B23K 9/232 |
| WO | WO-2005098241 A1 | * | 10/2005 | | B23K 20/122 |
| WO | WO-2015106244 A2 | * | 7/2015 | | B21J 15/02 |

* cited by examiner

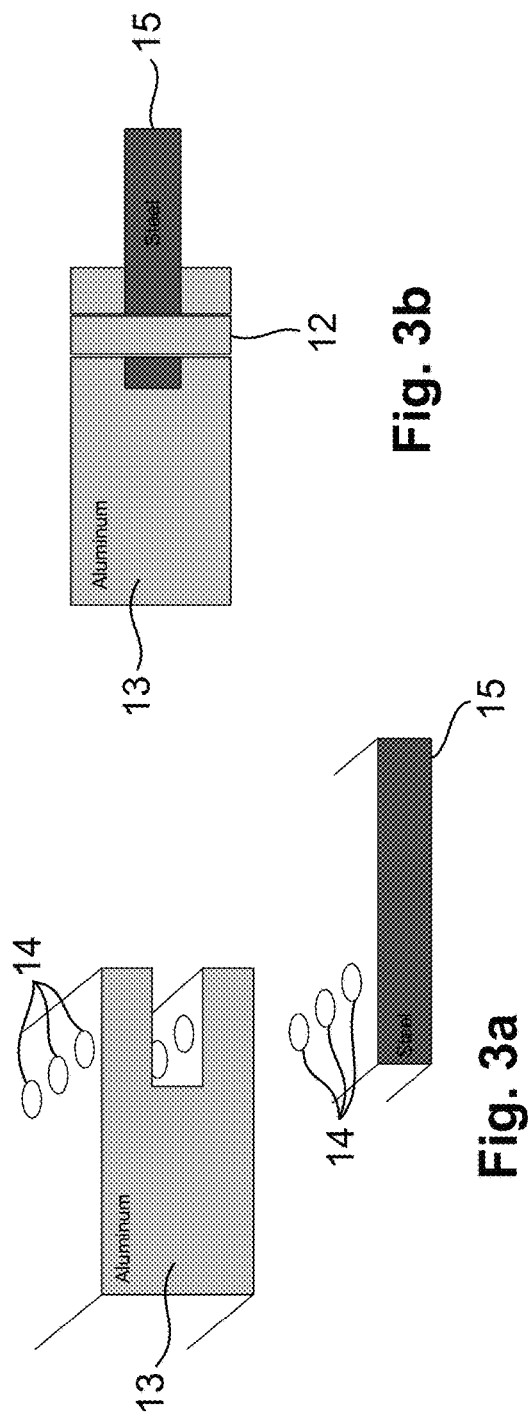
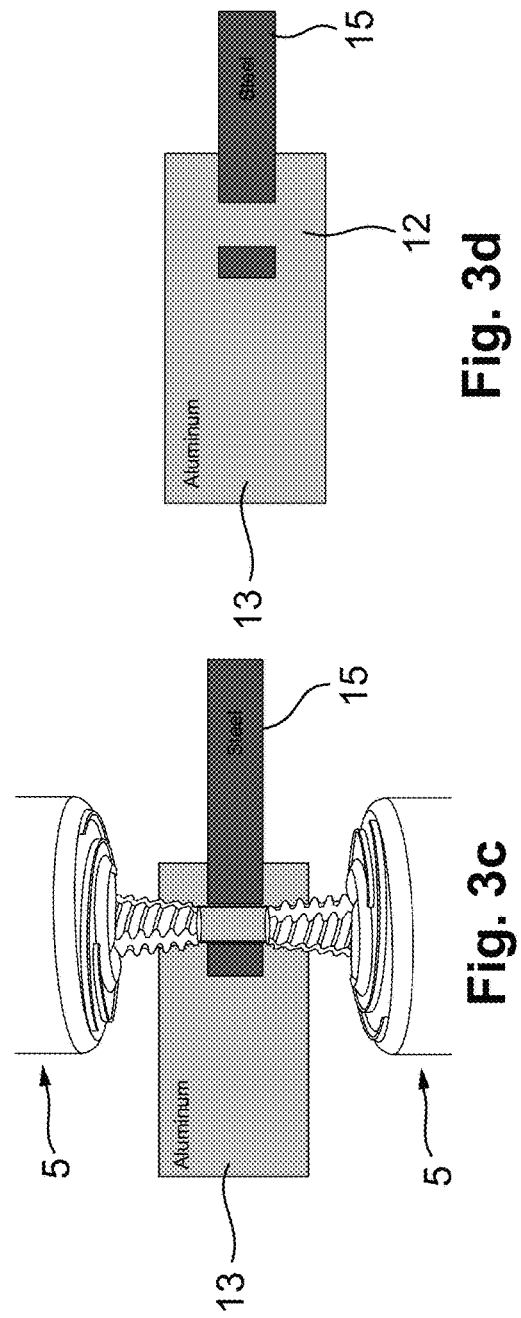

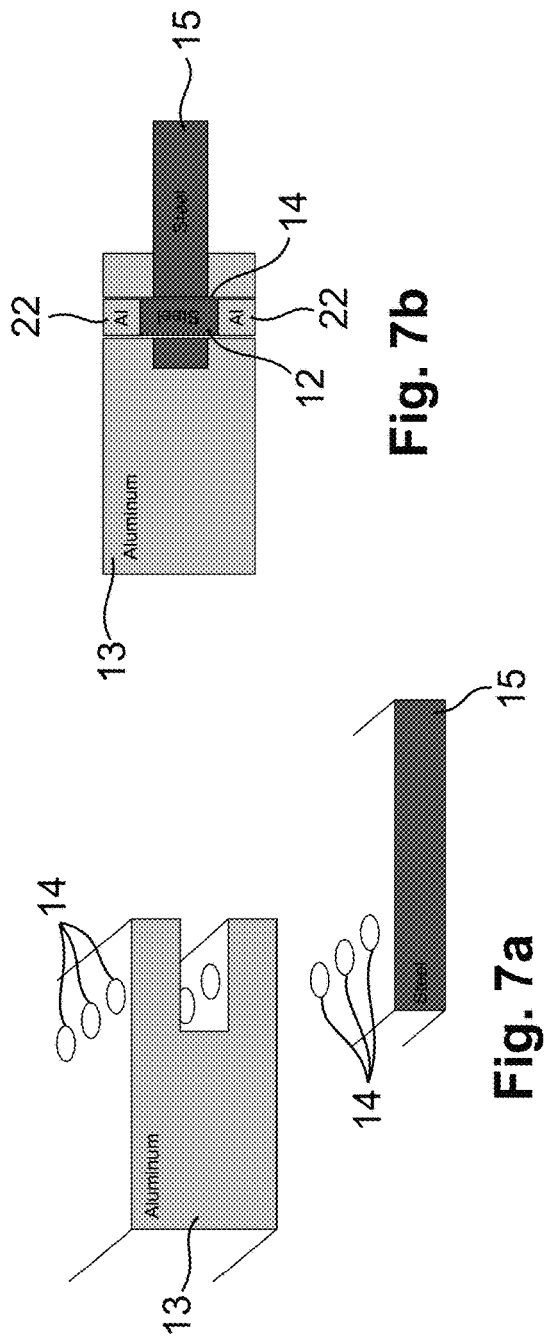
Fig. 7a
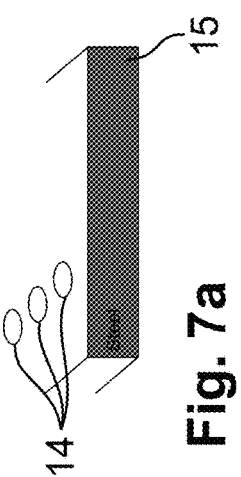
Fig. 7b
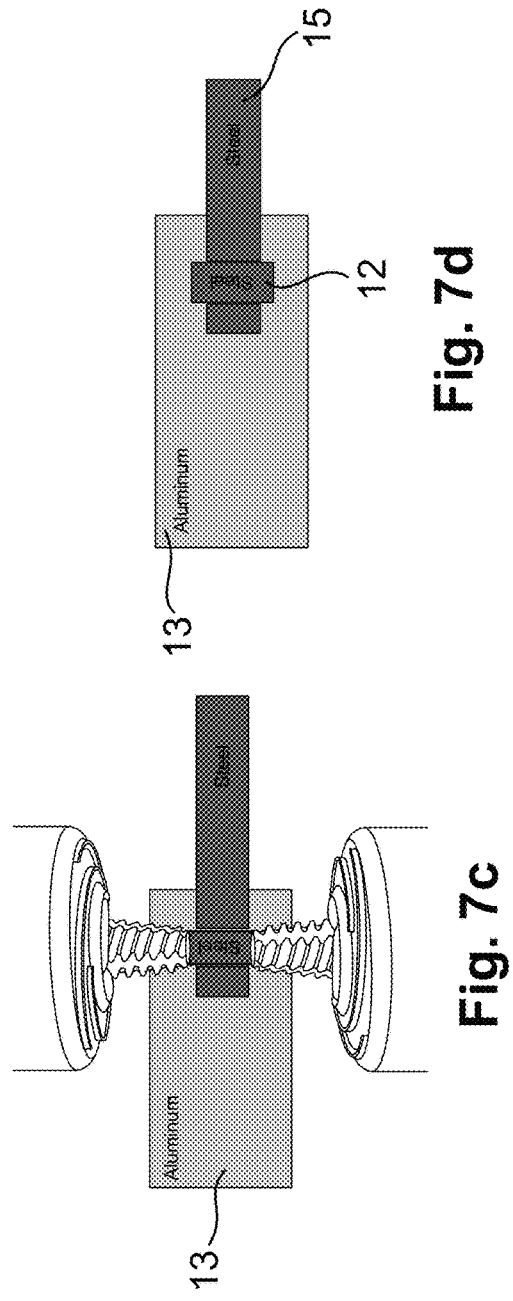
Fig. 7c
Fig. 7d

> US 10,369,748 B2

FRICTION STIRRING INTERLOCKING OF DISSIMILAR MATERIALS

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE INVENTION

The invention generally relates to methods for joining dissimilar materials and more particularly to connections between dissimilar metals having different melting points.

A world of rising energy necessitates approaches for reducing the amount of energy needed to perform standard tasks. Among approaches under development are lighter, more fuel efficient vehicles. Reducing the weight of vehicles can be accomplished in a variety of ways including replacing heavier steel regions with lighter weight materials. However, difficulty has arisen in attempting to find ways to robustly join dissimilar materials in a way that provides the needed strength and resiliency that exists in structures that are made from the same material. Preferably, and in some instances by requirement, these seams and interconnects must be welded together. Welding is fairly straight forward when the two materials have similar melting points but becomes more and more difficult when the materials have vastly different melting points or other characteristics.

Joining materials such as steel to aluminum, titanium, magnesium, copper, or any combination thereof, has proved difficult for a variety of reasons. The prior art generally teaches that when these materials are joined that the temperatures must be maintained generally low so as to prevent the formation of brittle intermetallic compounds, which are generally believed to cause the welds to be brittle and fail. Most prior art methodologies for joining dissimilar materials have focused on getting rid of these brittle intermetallic portions. However, the work arounds have generally proven to have negative side effects such as cost and complexity and in many instances simply do not provide an acceptable solution.

Hence what is needed is a process for forming high strength joints between dissimilar materials in ways that a simpler cheaper and more effective than the current methodologies. The present invention is a significant step forward in addressing these needs.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present disclosure provides a method for solid state joining of dissimilar materials using a friction stir welding device wherein a pin is inserted through an aperture defined in a first material and a second material to hold the materials together and then held in place by friction stir welding a portion of the pin to a material adjacent said pin, or by friction stir welding a cap or plug that holds the pin in place to the adjacent material. The result is a connection or join wherein the central portion of the pin is not friction stir welded but the portions holding the pin in place (the ends or caps) generally are.

The process makes possible the connection and interconnection of a variety of materials including embodiment wherein the combinations such as steel and aluminum, magnesium and aluminum or magnesium and steel or a metal and a non-metal such as aluminum and a carbon reinforced polymer can be interconnected. In some embodiments the first material is configured in to a C-shape and said second material is embodied in an insert, however a variety of other configurations are also possible and contemplated for obtaining this pin held inter connection.

This process and configuration finds application in a variety of fields including but not limited to: transportation vehicle manufacture, electronic product manufacturing, construction trades manufacturing and other applications. According the descriptions provided previously and the detailed descriptions here after should be seen as illustrative and not limiting.

Various advantages and novel features of the present invention are described herein and will become further readily apparent to those skilled in this art from the following detailed description. In the preceding and following descriptions, only the preferred embodiment of the invention have been shown and described, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

BRIEF DESCRIPTION OF THE DRAWINGS

FIGS. 3 (*a*)-(*d*) show a step wise process of one embodiment of the disclosure.

FIGS. 7(*a*)-(*d*) shows a step wise process of another embodiments.

DETAILED DESCRIPTION

The following description includes examples of various embodiments of the present disclosure. It will be clear from this description of that the invention is not limited to these illustrated embodiments but also includes a variety of modifications and embodiments thereto. Therefore, the present description should be seen as illustrative and not limiting. There is no intention in the specification to limit the invention to the specific form disclosed, but, on the contrary, the invention is to cover all modifications, alternative constructions, and equivalents falling within the spirit and scope of the invention as defined in the claims.

Friction Stir Interlocking (FSI) is a new methodology for joining dissimilar materials such as lightweight metals to composites, thermoset plastics, or other non-metallic materials. Metals with vastly different melting temperatures which cannot be joined by conventional welding can also be joined by FSI. Currently the state-of-the-art for joining Mg and Al to carbon fiber (CF) and other non-metal is conventional mechanical fastening and adhesive bonding. Solid-phase approaches such as Friction Stir Welding, Scribe, Riveting, Pillaring and Spot Welding are all being investigated but face significant challenges with joint strength, fatigue, damaging the carbon fiber materials, slow process speed and galvanic corrosion. The FSI process described herein provides solutions to many of these issues.

Figure 1:
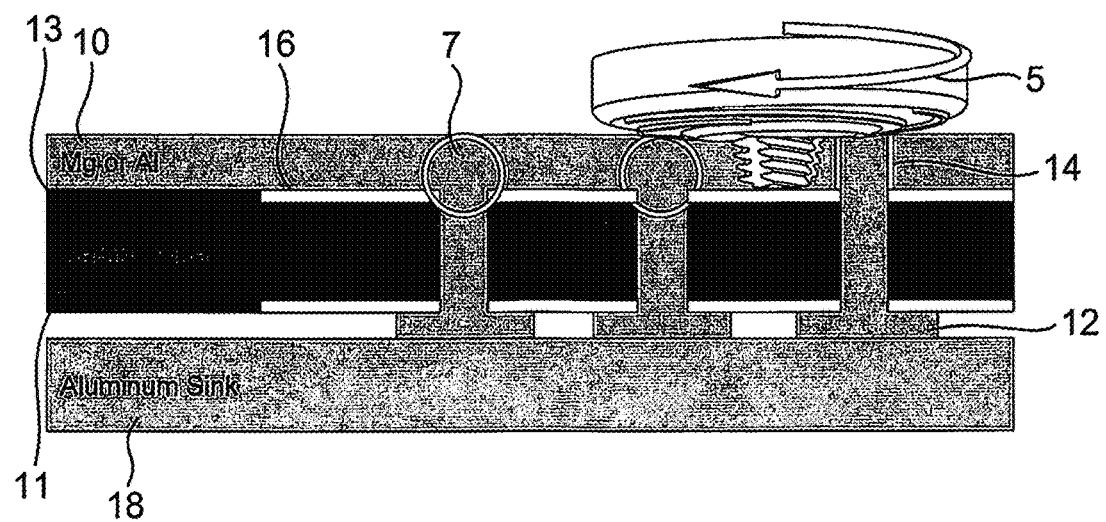
FIG. 1 shows a detailed cut through view of one example of the present disclosure.
Figure 2A:
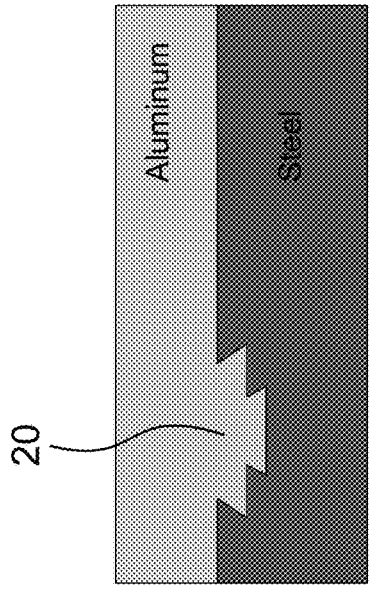
FIGS. 2(*a*)-2(*d*) show various alternative applications for connecting dissimilar materials.
Figure 2B:
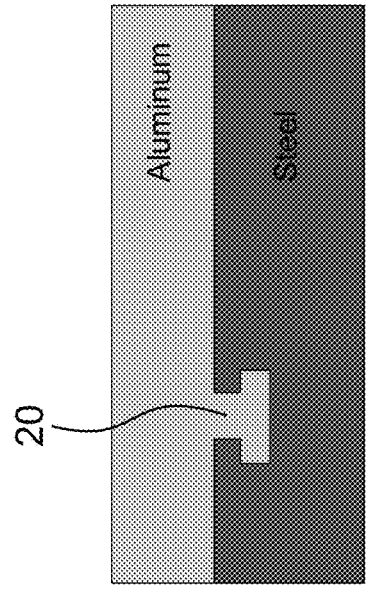
Figure 2C:
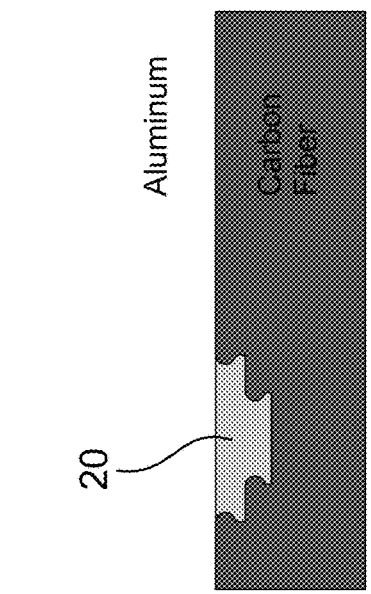
Figure 2D:
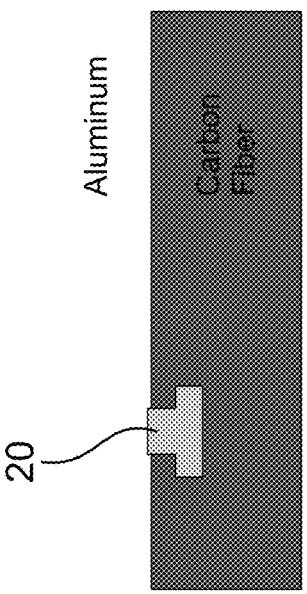

In one embodiment shown in FIG. 1, a method for joining Mg and Al to non-metals is shown. Referring first to FIG. 1. Here, pins 12 that match the material of the first sheet 10 (in this case a metal such as Mg or Al) 10 are inserted up through holes 14 cut in the second material (in this case a non-metal such as a carbon fiber or carbon reinforced carbon composite 11 and first sheet 10. These pins 12 are designed to be flush with the top of the sheet when inserted. (While in this particular arrangement the pins are designed to be flush it is to be understood that this arrangement is only exemplary and that pins may be variously arranged and designed to extend above or below the surfaces of the top or bottom sheets depending upon the needs of the user.) A specially designed FSW tool 5 then traverses the joint 7 and welds the pins 12 to the sheet 10 to complete the joint 7. The large hydrostatic pressure in the plasticizing metal during welding will fill any small tolerance gaps, between the pin 12 and the non-metal material which defines the hole 14 through which the pin 12 was inserted. In some instances a thermally activated adhesive film 16 can be applied between the metal-non-metal interface 13 prior to welding to improve joint 7 strength. The film 16 will also serve as a barrier to galvanic corrosion by sealing against electrolyte imbibition into the joint interfaces. The joint could certainly be made without the added step of an adhesive film 16 if desired. For the example in FIG. 3 an arrangement is provided wherein embedded bar inserts are shown running the entire course of the weld or joint 7 or smaller inserts to accommodate spot or stitch weld.

In a variety of other embodiments are variety of other shapes, patterns and cross sections for the various pins 12 and corresponding holes 14 through which they can be inserted. As a friction stir process, numerous interlocks can be created quickly and uniformly, in a single pass, offering reduced cost and improved process efficiency compared to conventional metal-to-non-metal fasteners. Galvanic corrosion between the metal fasteners and carbon fibers can be nearly eliminated using FSI. In many instance the short process time (a few seconds) and low process temperature (as low as 250° C. for Mg) make this friction stir interlocking FSI approach attractive for joining Mg and Al to carbon fiber CF without substantially degrading the CF material properties.

In another embodiments of the invention (shown in the various FIG. 2 arrangements) Metal inserts 20 of various configurations can be placed within a non-metal materials, such as carbon fiber reinforced polymer (CFRP) or carbon fiber reinforced composite (CFRC) during the typical CFRC or CFRP production processes. Once embedded within the non-metal materials, these metal materials can be subsequently friction stir welded to Mg, Al or other metal materials. As such, a metallurgical bond is formed between the sheet and insert, and joint strength is governed by the chemical bonding and mechanical interlocking between the metal insert and the non-metal material (CFRP). With this process, mechanical interlocks are created without disrupting the carbon fibers or matrix. In one exemplary arrangement an aluminum insert is embedded into a carbon fiber composite during the fabrication of the composite. The carbon fiber composite is then injection molded around the insert to create an assembly such as the ones shows in FIG. 2.

In other embodiments the plate of insert material such as Mg. or Al can be placed over a CFRP or CFRC assembly and then friction stir wielded along a weld path joining the plate to the insert embedded during fabrication of the CFRP or CFRC. Linear inserts such as these that are shown are can be advantageous because they provide a continuous joint along the dissimilar interface. Spot welding inserts using similar methods could also be embedded during the manufacturing of the carbon fiber composite. Forming carbon fiber composites around inserts allow for resign to adhere to the insert and allow for mechanical interlocking. This method allows for faster FSW processes and reduces heat input into carbon fiber.

In other variations, magnesium overcasting can be performed using any of a variety of metals such as Mg or Al and alloys thereof. In one particular instance a high-pressure die cast (HPDC) Mg alloy is directly cast over a short section of the CFRC component such that the carbon fiber reinforced composite CFRC section is completely embedded within the Mg casting to create a strong mechanical interlocking joint. Embedded inserts may also be used to enhance joint strength. Although CFRC will in general burn/decompose easily at the temperature corresponding to the melting point of Mg alloys (T>600 C), rapid solidification of molten Mg (i.e. within 1-2 seconds) and subsequent cooling during HPDC will sufficiently limit the surface decomposition of the bulk CFRP to form a robust mechanical joint.

The advantage of the Mg-CFRC overcasting method is that it avoids the need for machining or disturbance of the casting or CFRC while enabling joint geometries that are otherwise cumbersome to machine or not feasible by conventional mechanical fastening methods. While challenges may arise in creating a Mg-CFRC joint by overcasting because of the burn-off/thermal decomposition of the CFRC composite when it comes in contact with molten Mg and also during subsequent cooling of the solidified casting. This challenge can be addressed in two ways: 1) the Mg solidification rate is controlled to minimizing the duration for which the CFRC is exposed to temperature above its thermal decomposition temperature and (2) temperature-resistant coatings (e.g. graphite, boron nitride, etc.) on the CFRP are used to prevent erosion via direct contact with flowing molten metal.

In other circumstances, various other interlocking configurations and applications are shown. FIG. 3 shows an arrangement wherein, a block of a first material 13 such as aluminum is machined to produce a series of apertures or cutouts 14 dimensioned to align with apertures in an inserted second material 15 as well as various pins 12 which are to be entered through these various apertures 14. These sections in the first material are configured to align with a corresponding set of apertures 14 in a second material, A pin 12, typically made of the same material as the block and having a length sufficient to extend through the block 13 and to match the top and bottom surfaces of the block is then inserted through the openings and a friction stir welding device is then used to plasticize and weld the two ends of the pin 12 into the block 13 and within block 15. When this happens the first block 13 and pin 12 materials plasticize and fill gaps, however the distance between the second material 15 and the FSW tool pin tip prevent plasticization of the entire pin 12 and also prevents formation of intermetallic features within the block 13. This will provide a rapid, cost-effective, repeatable process. Such a process could be an enabling technology for light weighting of automotive components or any application where robust joints are needed for example between steel, Mg, Al and various other metals and non-metals.

Figure 4:
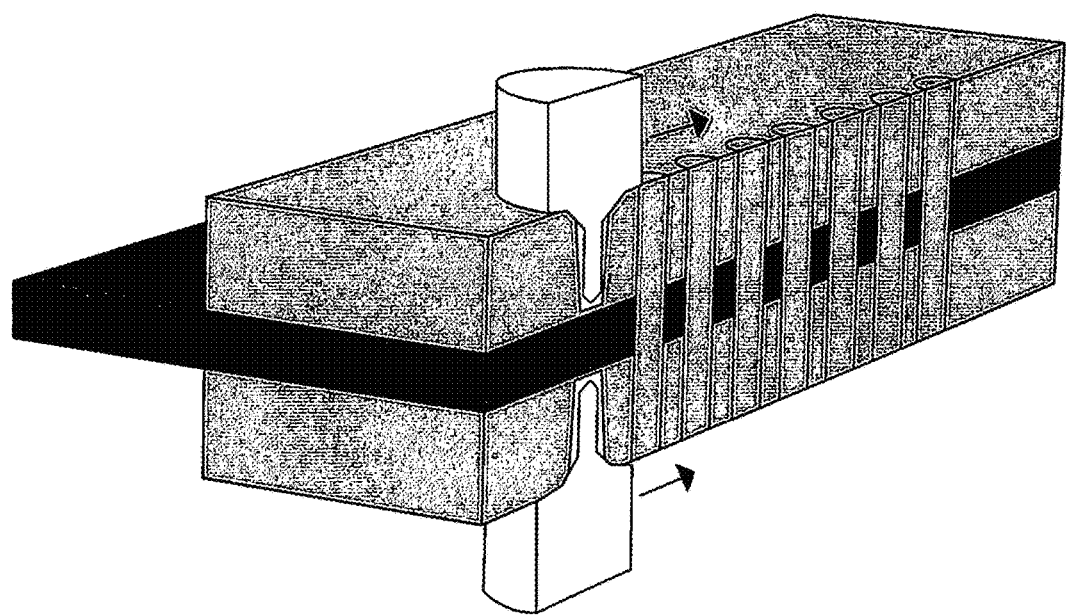
FIG. 4 shows another embodiment of the disclosure
Figure 5:
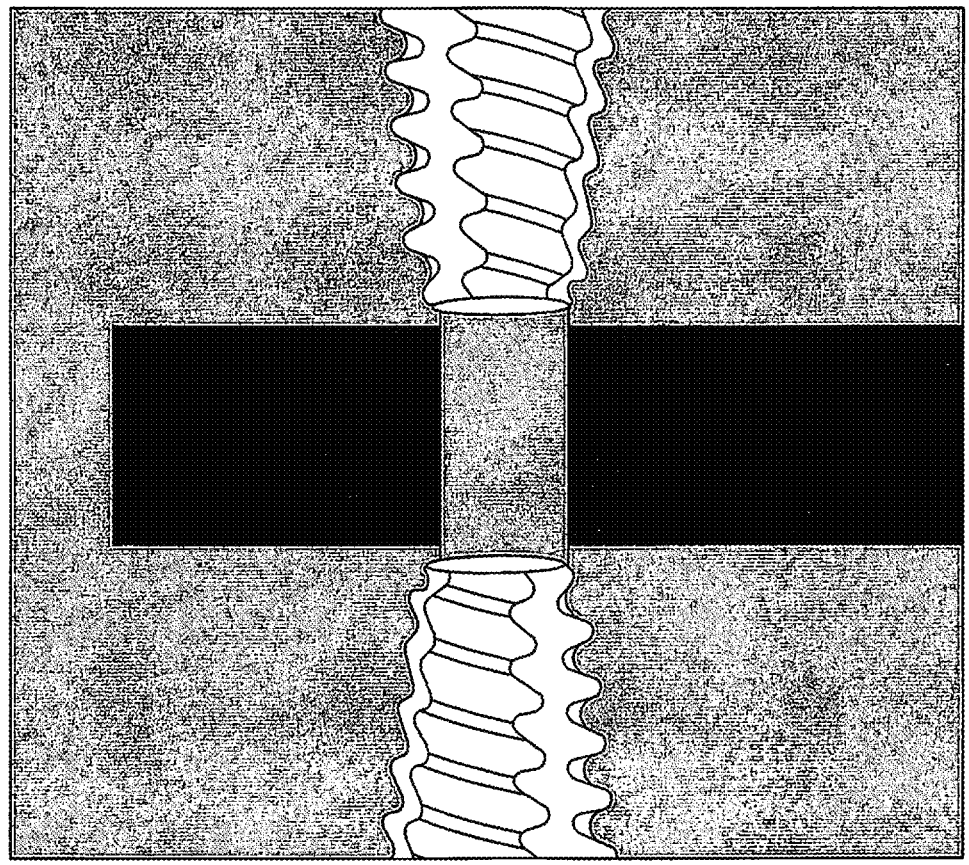
FIG. 5 shows a cut away of a joint described in the present disclosure

In one example shown in FIG. 4, a welded plate formed according to this process is shown. In testing several sections of this welded plate were removed and subjected to tensile testing. FIG. 5 shows one of these sections that was cut through the center portion of a pin is shown interlocking between the aluminum and steel. The location is the tool pin path where the pin is processed as indicated, while the pin within the steel is not processed. A plot showing this data is provided in FIG. 6 where the lower two curves are for aluminum pins, processed with different weld speeds and penetration depths.

Figure 6:
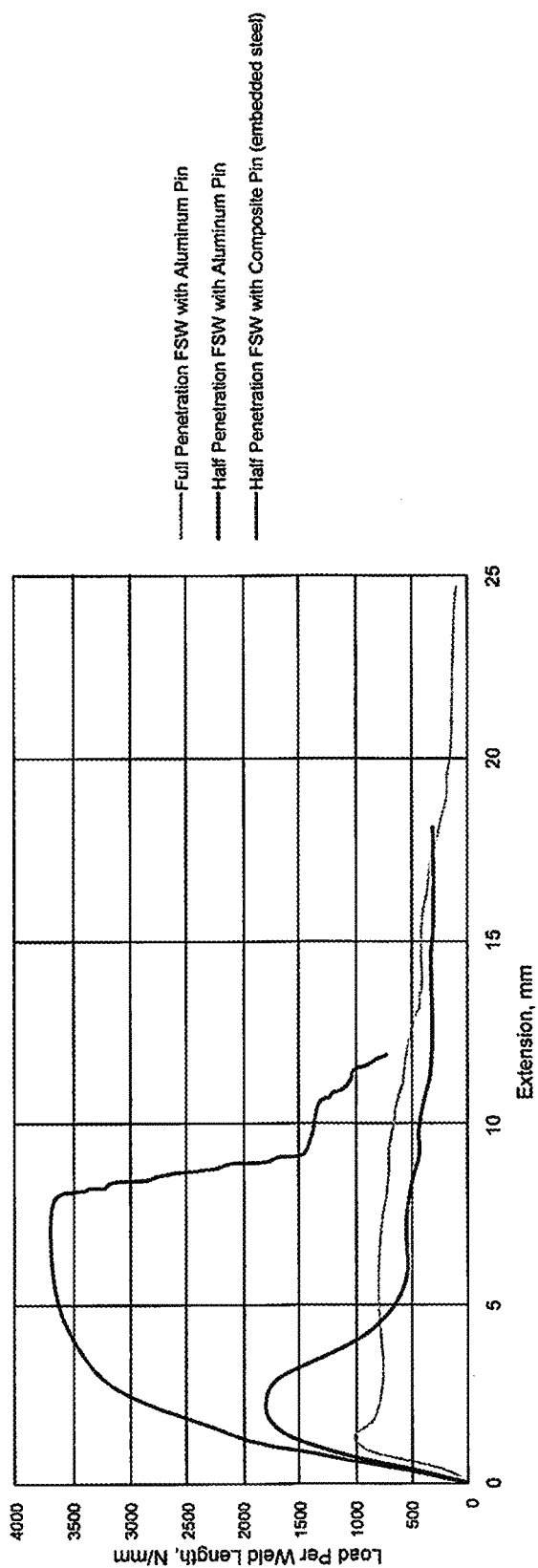
FIG. 6 shows the results of testing performed in various described applications.

In another embodiment of the invention the aluminum pin 12 is replaced with a steel pin 12 and the approach is to lock the steel pin into the aluminum via friction stir welding. This is done by FSW through aluminum plugs 22 inserted on each side of the steel pin 12 as shown in FIG. 7. This approach has particular application to large scale applications such as bridges, towers and other large structures where joint strength and corrosion is currently a limitation for aluminum to steel connections. Unlike conventional bolt/nut fastening, this approach seals the fastener from electrolyte penetration which occurs at the head and nut end of conventional fasteners. The upper curve in FIG. 6 shows the strength advantage of the concept described in FIG. 7.

Figure 8:
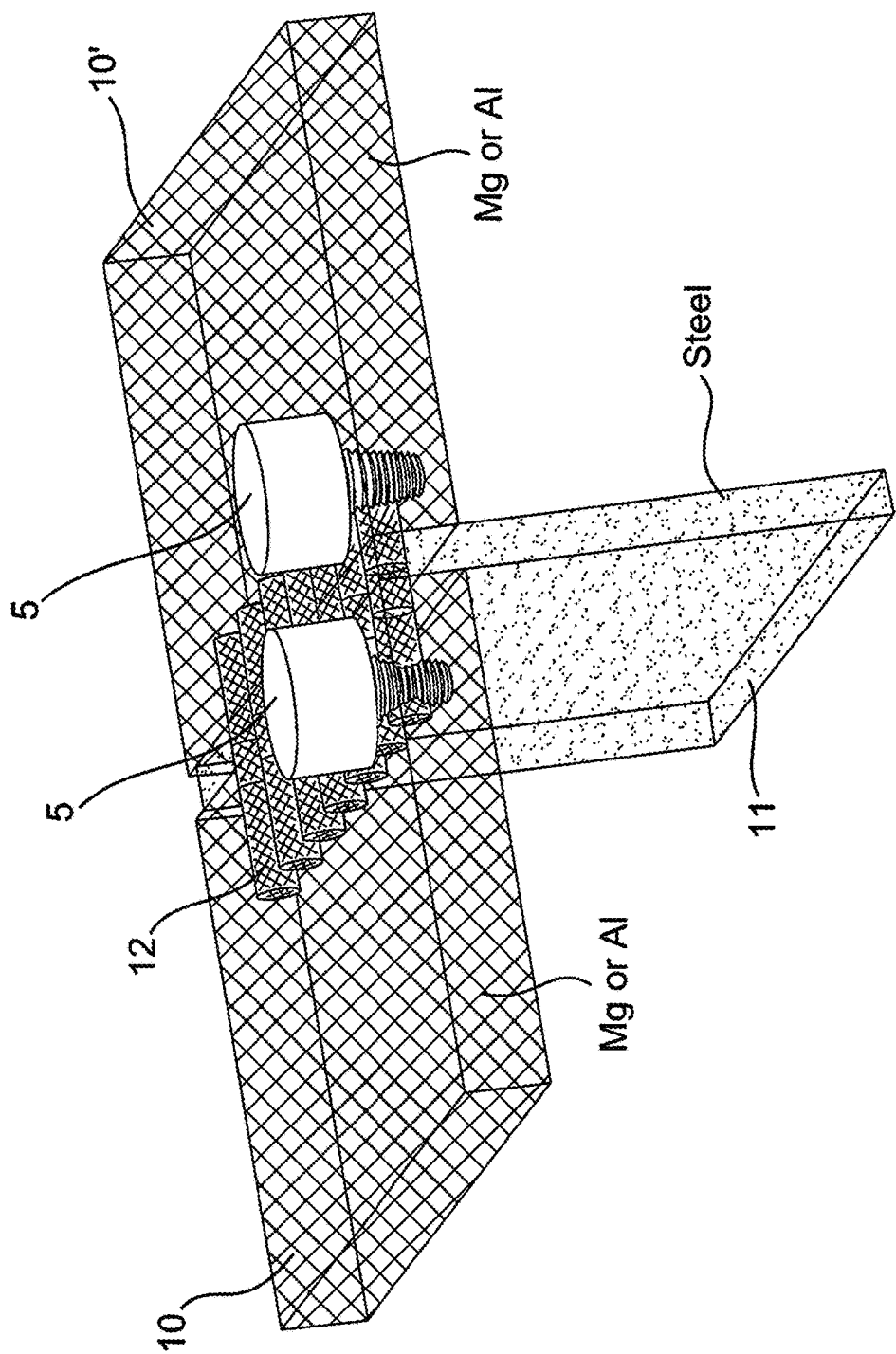
FIG. 8 shows another embodiment including a T-joint configuration

FIG. 8 shows another arrangement (a T-shape) wherein plates of a first material (10, 10') such as Mg or Al are connected to a plate 11 of a second material such as steel by running pins 12 made of the first material through apertures 14 contained in the plates and friction stir welded into place so as to form a single unitary joint 7. The present invention provides a variety of advantages over the prior art and provides the ability to connect dissimilar materials and enable structures and arrangements that are not currently available.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A method for solid state joining of dissimilar materials using a friction stir welding device, the method comprising the steps of:
    inserting a pin having two ends within an aperture defined in a first material and a carbon reinforced composite material; and
    friction stir welding each end of the pin to a portion of the first material.

2. The method of claim 1 wherein said first material is aluminum.

3. The method of claim 1 wherein said first material is steel.

4. The method of claim 1 wherein said first material is configured in to a C-shape, and the carbon reinforced composite material is embodied in an insert configured to fit within said C-shaped material.

5. A method for solid state joining of dissimilar materials using a friction stir welding device comprising the steps of:
    inserting an insert within an aperture defined in a first material made of aluminum configured into a C-shape and a second material embodied in an insert configured to fit within said C-shape, and
    friction stir welding a portion of said insert to a material adjacent to said insert.

6. The method of claim 5 wherein said second material is steel.

7. The method claim 5 wherein said second material is a carbon reinforced composite.

8. The method of claim 5 wherein said insert is a pin has two ends and is friction stir welded in each end to the first material.

9. The method of claim 5 wherein said first material is aluminum and said second material is steel.

10. The method of claim 5 wherein said first material is steel and said second material is aluminum.

* * * * *